US008515967B2

(12) United States Patent
Agarwala et al.

(10) Patent No.: US 8,515,967 B2
(45) Date of Patent: Aug. 20, 2013

(54) COST AND POWER EFFICIENT STORAGE AREA NETWORK PROVISIONING

(75) Inventors: Sandip Agarwala, Sunnyvale, CA (US); Harsha D. Gunatilaka, Tucson, AZ (US); Ramani R. Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 12/749,435

(22) Filed: Mar. 29, 2010

(65) Prior Publication Data

US 2011/0238672 A1 Sep. 29, 2011

(51) Int. Cl.
G06F 7/00 (2006.01)

(52) U.S. Cl.
USPC .......... 707/748; 707/769; 711/101; 711/117; 711/147; 713/300

(58) Field of Classification Search
None
See application file for complete search history.

(56) References Cited

U.S. PATENT DOCUMENTS

| | | | |
|---|---|---|---|
| 8,032,701 B1 * | 10/2011 | Glade et al. | 711/114 |
| 2007/0067657 A1 | 3/2007 | Ranganathan et al. | |
| 2007/0260897 A1 | 11/2007 | Cochran et al. | |
| 2007/0300085 A1 | 12/2007 | Goodrum et al. | |
| 2008/0184044 A1 | 7/2008 | Leech et al. | |
| 2009/0049210 A1 * | 2/2009 | Bartlett et al. | 710/33 |
| 2009/0113221 A1 | 4/2009 | Holle et al. | |
| 2009/0119523 A1 | 5/2009 | Totten | |
| 2009/0119673 A1 | 5/2009 | Bubba | |
| 2009/0125737 A1 | 5/2009 | Brey et al. | |
| 2009/0144566 A1 | 6/2009 | Bletsch et al. | |
| 2009/0187776 A1 | 7/2009 | Baba et al. | |
| 2009/0187782 A1 | 7/2009 | Greene et al. | |
| 2009/0259345 A1 | 10/2009 | Kato et al. | |
| 2009/0265568 A1 | 10/2009 | Jackson | |
| 2011/0173303 A1 * | 7/2011 | Rider | 709/220 |

OTHER PUBLICATIONS

IBM, "Method for Revenue Optimization of Dynamically Allocated Resources," www.ip.com No. IPCOM000149994D, Apr. 14, 2007, 4 pages.
IBM, "Method of transferring workloads between datacenters based on datacenter power profiles," www.ip.com No. IPCOM000175020D, Oct. 2, 2008, 2 pages.
Priya Mahadevan et al., "Energy Aware Network Operations," INFOCOM Workshops, Apr. 2009, 6 pages.
Justin Moore et al., "Data Center Workload Monitoring, Analysis, and Emulation," Eighth Workshop on Computer Architecture Evaluation using Commercial Workloads, 2005, 8 pages.

(Continued)

*Primary Examiner* — Fred I Ehichioya
*Assistant Examiner* — Hasanul Mobin
(74) *Attorney, Agent, or Firm* — Griffiths & Seaton PLLC

(57) ABSTRACT

Various embodiments for efficiently provisioning a storage area network (SAN) are provided. In one embodiment, SAN information is provided to an engine for optimization. The SAN information includes at least one of SAN configuration information, SAN usage information, at least one cost profile, and at least one chargeback model. Based on the SAN information, those of an available plurality of storage resources not meeting at least one storage criterion are filtered. The filtered storage resources are ranked on a cost basis. A resource configuration graph is constructed based on the ranked storage resources. The resource configuration graph is traversed to obtain a plurality of possible SAN configuration plans. At least one power profile is applied to the plurality of possible SAN configuration plans to rank the plurality of possible SAN configuration plans by energy consumption.

22 Claims, 7 Drawing Sheets

(56) References Cited

OTHER PUBLICATIONS

Ehsan Pakbaznia et al, "Minimizing Data Center Cooling and Server Power Costs," 2009, ACM 978-1-60558-684-7/09/08, pp. 145-150.

Andrzej Kochut, "On Impact of Dynamic Virtual Machine Reallocation on Data Center Efficiency," IEEE 978-1-4244-2818-2/08, 2008, 8 pages.

* cited by examiner

US 8,515,967 B2

COST AND POWER EFFICIENT STORAGE AREA NETWORK PROVISIONING

BACKGROUND OF THE INVENTION

1. Field of the Invention

The present invention relates in general to computers, and more particularly to a method, system, and computer program product for cost and power efficient storage area network (SAN) provisioning in computing storage environments.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE INVENTION

Because a variety of interconnected devices and systems may be used to manage a particular body of data, it is beneficial to present to the user an organization of logically organized storage units (such as volumes) to which the user may assign storage. As a result, the user does not need the specific knowledge of the underlying physical storage device allocations to such logical units. Currently, a user of such "virtualized" multi-tiered computing environments must first, before storage activity on a particular storage unit takes place, configure the unit, such as a logical unit number (LUN), as part of a storage class (e.g., high/low latency or high/low capacity) by anticipating the workload of an owning application, for example.

The user, however, is generally unaware of application and storage performance requirements previous to full system configuration and use, and further, is unaware how to dynamically optimize such storage units, for example, if new storage applications are used on an existing storage configuration. Furthermore, the user may not be aware of a best configuration to maximize certain efficiencies (such as minimum cost or power consumption, for example). As a result, a need exists for a mechanism whereby the user is ensured accurate assignment of storage units into particular storage classes taking various efficiencies into consideration, and moreover, dynamic optimization of such configurations, for example in the event of changes to the computing environment.

In view of the foregoing, various embodiments for efficiently provisioning a storage area network (SAN) are provided. In one embodiment, by way of example only, a method for efficiently provisioning a SAN is provided. Pursuant to this method, SAN information is provided to an engine for optimization. The SAN information includes at least one of SAN configuration information, SAN usage information, at least one cost profile, and at least one chargeback model. Based on the SAN information, those of an available plurality of storage resources not meeting at least one storage criterion are filtered. The filtered storage resources are ranked on a cost basis. A resource configuration graph is constructed based on the ranked storage resources. The resource configuration graph is traversed to obtain a plurality of possible SAN configuration plans. At least one power profile is applied to the plurality of possible SAN configuration plans to rank the plurality of possible SAN configuration plans by energy consumption.

In addition to the foregoing exemplary embodiment, various system and computer program embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
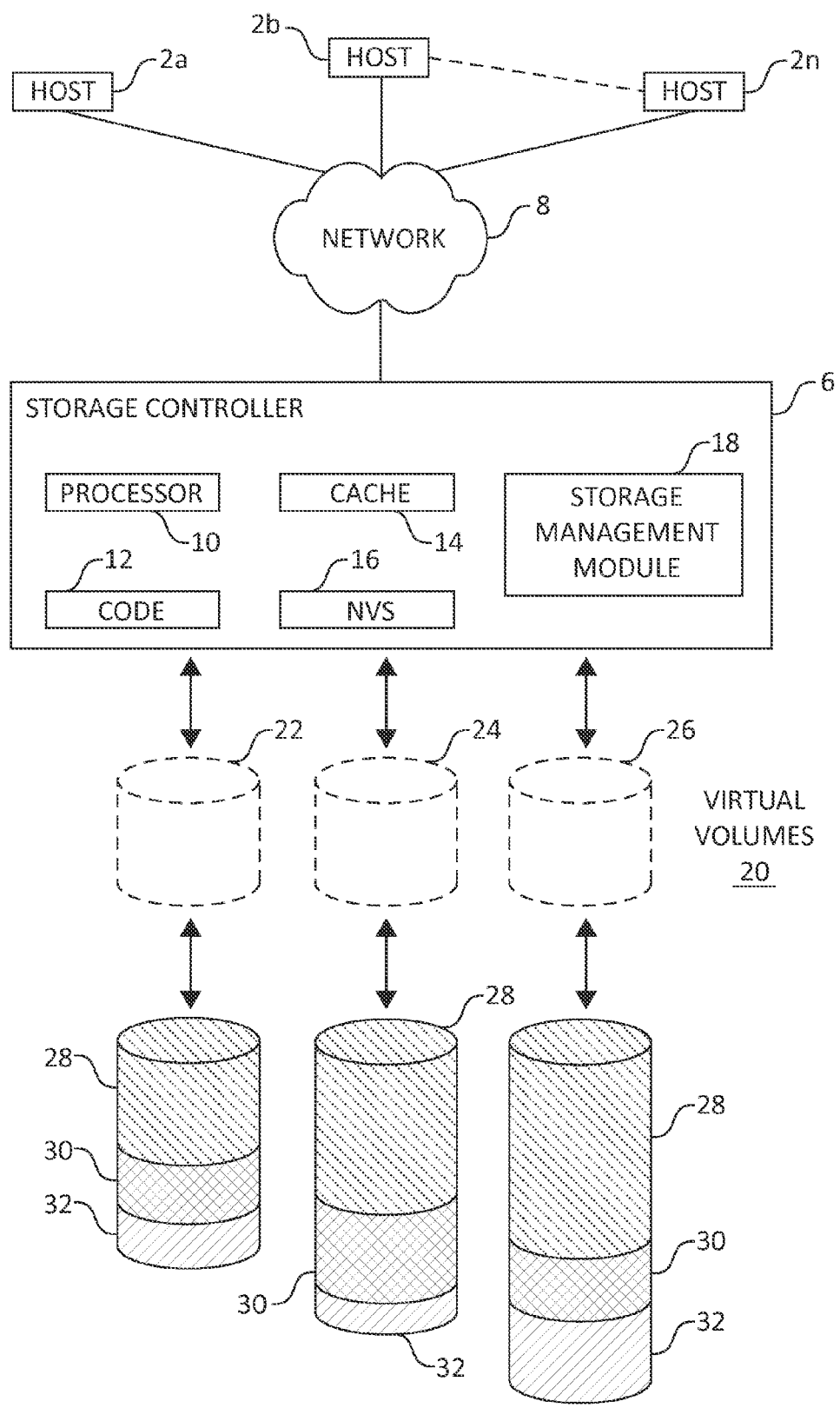
FIG. 1 is a block diagram illustrating an exemplary multi-tiered data storage computing environment which may implement aspects of the present invention.

As enterprises grow, they become more and more reliant on so-called information technology (IT). The increasing reliance in IT has resulted in a corresponding increase in IT expenditure, which is now a significant portion of the operational budget of many enterprises. With the recent economic crisis and ever-increasing IT costs, chief information officers (CIOs) are under pressure to reduce/contain IT expenditure. In order to achieve this, enterprises are moving towards more automation (for reducing management cost), adopting cost efficient technologies like virtualization (again, as mentioned previously) and shared network storage like storage area networks (SAN) or network attached storage (NAS), and in general, making more efficient use of the available resources in their datacenter.

Different departments or business units within an enterprise either access IT resources from their shared data center or from external provider. These departments may be charged based on the type and volume of their IT usage, for example. In order to avoid any unwanted surprises, they may want to specify certain cost criterion in addition to their other requirements while provisioning for IT resources (storage, computing, etc.).

As enterprise datacenters grow in size, their power requirements also grow. With decreasing energy resources and the corresponding rise in energy cost, power consumption in enterprise datacenters is becoming a growing concern. While progress has been made in reducing server power consumption, enterprise storage has lagged behind. One of the reasons for this discrepancy is that aggressive power management may have an adverse affect on storage performance and availability. Recent studies have shown that storage consumes almost 40% of the datacenter power budget.

Many different approaches have been developed recently for making storage system more power efficient with varying amount of success. These includes MAID (Massive Array of Idle Disks) concept, where less-utilized disks are put into a low power state. Another approach is hierarchical storage management (HSM), where less active data is moved to low power low performance storage such as tape, and more active data is moved to memory-based or hard-disk based storage, which consumes more power but delivers better performance. These approaches, however, rely on special architectural support (like HSM, variable power mode in disks, etc.) or they require comprehensive power models of the storage systems, which may not be easily obtainable.

To address the need for a solution whereby users may efficiently provision storage resources in view of various restraints such as cost and power consumption as described above, the illustrated embodiments provide mechanisms for such efficient provision. For example, the illustrated embodiments provide mechanisms for accommodating cost/budget/power constraints of the user, while provisioning IT resources for the user's workloads. While these mechanisms are applicable in a broad sense to many storage environments, the illustrated embodiments feature storage area network (SAN) implementations, as will be seen, following.

A typical SAN includes one or more storage subsystems connected to host computers either directly or via a set of fiber channel switches, for example. SAN provisioning is either done manually by highly skilled administrators or by using automated planning tools, as one of ordinary skill in the art will appreciate. Manual provisioning tends to be costly, time-consuming and error-prone. Current automated approaches to SAN provisioning may focus on space, performance and resiliency requirements of the workloads without any consideration for the cost. These may result in an allocation that does not fit user's budget.

Multiple challenges arise while trying to automate SAN provisioning. First, SANs are typically composed of many heterogeneous resources like storage subsystems, fiber channel switches, host bus adapters (HBAs), etc. These may come from different vendors and may have very different internal architectures. Second, different workloads may have different characteristics, and each of them may have certain unique requirements. Optimizing across multiple requirements is a challenge. More often than not, these requirements (cost vs. performance, for example) may conflict with each other. A brute force algorithm for such multi-objective optimization may take a disproportionate amount of time to solve optimally.

Third, administrator or IT providers may want to achieve certain goals (e.g. load balancing, resource prioritization, etc.) while allocating SAN resources for the users' workloads. Fourth, a single workload may need multiple SAN resources for the workload to function. Apportioning the total budget to different resources while satisfying the space, performance and resiliency requirements is a non-trivial task. Finally, different enterprises may choose to use different chargeback models for cost allocation.

The illustrated embodiments provide an integrated, end-to-end approach to SAN provisioning that satisfies space, performance, and resiliency requirements of system workloads while addressing cost and power consumption constraints. In order to perform end-to-end SAN provisioning, an optimization framework may be defined inclusive of a set of objective functions and a set of constraints. A resource configuration graph may be constructed as will be further described, where each node may be annotated with its unit cost (along with other information). The mechanisms of the illustrated embodiments then may perform a domain-specific graph search to identify paths (i.e., plans) that satisfy the constraints and objective functions. These cost-efficient allocation plans are then ranked based on some default or user-specified attributes.

As will be further described, once these cost-efficient allocation plans are ranked, the illustrated embodiments apply intelligent power profiles having a view to consolidate different workloads into a minimal number of resource arrays, while assigning the resources to those arrays that would consume a minimal amount of power. The result is one or more SAN provisioning plans that efficiently address cost and power consumption constraints.

In the following description, reference is made to the accompanying drawings which form a part hereof and which illustrate several embodiments of the present invention. It is understood that other embodiments may be utilized and structural and operational changes may be made without departing from the scope of the present invention. FIG. 1 illustrates a computing storage environment in which aspects of the invention may be implemented. A plurality of host systems $2a, b \ldots n$ transmit Input/Output (I/O) requests to one or more storage volumes 28, 30, and 32 through a storage controller 6 which manages access to the storage volumes 28, 30, and 32. In certain implementations, the storage volumes may be physically comprised of a plurality of hard disk drives organized as Just a Bunch of disks (JBOD), a RAID array, Direct Access Storage Devices (DASD), SSD, tape devices, etc.

A number of virtual volumes 22, 24, and 26 are presented to the host systems $2a, b \ldots n$ in lieu of presenting a number of physical or logical volumes (often which may be physically configured in a complex relationship). The host systems $2a, b \ldots n$ may communicate with the storage controller 6 over a network 8, such as the Internet, a Storage Area Network (SAN), an Intranet, Local Area Network (LAN), Wide Area Network (WAN), etc., using multiple communication protocols such as TCP/IP, Fibre Channel, Ethernet, etc. at different layers in a protocol stack.

The storage controller 6 includes a processor 10 executing code 12 to perform storage controller operations. In one embodiment, the processor 10 may be operational as a storage management processor (SMP). The storage controller 6 further includes a cache 14 and non-volatile storage unit 16, such as a battery backed-up memory device. The storage controller 6 stores in cache 14 data updates received from the hosts $2a, b \ldots n$ to write to the virtual storage volumes 22, 24, and 26 (and thereby to volumes 28, 30, and 32) as well as data read from the volumes 28, 30, and 32 to return to the hosts $2a, b \ldots n$. When operating in Fast Write mode, data updates received from the hosts $2a, b \ldots n$ are copied to both cache 14 and the NVS 16. End status is returned to the host 2*a, b . . . n* sending the data update after the update is copied to both the cache 14 and NVS 16.

FIG. 1, as one of ordinary skill in the art will appreciate, may illustrate a portion of a larger, multi-system/multi-cluster storage environment having a number of interrelated components such as the previously illustrated storage controller 6. As previously indicated, while virtual volumes 22, 24, and 26 are presented to the user via the host systems 2*a, b . . . n*, the underlying physical configuration may take many possible forms. For example, a number of interrelated storage devices in various classes, such as SSD, SATA, HDD, tape, etc. may comprise the storage volumes 28, 30, and 32 depending on a particular configuration. Furthermore, a number of interrelated storage devices that comprise the storage volumes 28, 30, 32, and others may be organized into various relationships, such as a particular redundant array of independent disks (RAID) configuration, common fabric connectivity, redundancy, copy services relationships, and the like.

Various components of the storage environment, such as processor 10, may be adapted to implement aspects of the present invention and following claimed subject matter. For example, a storage management module 18 may operate in conjunction with processor 10 to perform various functional aspects to be further described, such monitoring and/or determining SAN configuration or use information, maintaining cost profiles and chargeback models, ranking storage resources, constructing a resource configuration graph, traversing the resource configuration graph to obtain a listing of possible SAN configuration paths, and applying power profiles to such possible SAN configuration paths. One of ordinary skill in the art will appreciate that other various data processing and memory components may be implemented to realize these aspects, and may be operational on the storage controller 6, or elsewhere.

SAN planning may be performed in a multi-step approach. As a first step, a set of storage volumes is created in one or more storage subsystems. This step selects pools and RAID configurations that can meet space and performance requirements of the workloads. Second, end-to-end logical paths are configured from the subsystem (where volumes are created) to the host(s) through the process of LUN masking/mapping. Depending on the workload requirement, this step may configure one or more fiber channel paths using one or more fabric to establish communication path between the host(s) and the newly created volume(s). Third, copy service relationships are configured based on the RPO/RTO (recovery point objective or recovery time objective) of the workload.

From a cost perspective, each of the above steps may incur different amount of cost depending on the selection of the resources and configurations that were made in each individual step. To be effective, the provisioning algorithm should intelligently apportion the total budget for different resources and satisfy other workload requirements. A user may specify their budget constraints in one of the three ways. Each type of budget constraint may be considered by the illustrated embodiments to develop an appropriate SAN provisioning plan. First, a user may wish to minimize cost. Instead of specifying a fixed budget, the user may request a minimum cost provisioning plan that meets all other workload requirements (space, performance, resiliency). Secondly, the user may wish to minimize a total budget (i.e., the maximum total allowable cost for provisioning the workload). Thirdly, the user may operate under a resource specific budget constraint, where the user specifies a cost allocation for individual SAN resources. For example, the user may wish to specify $100 for storage capacity, and $10 for copy services.

In addition to the budget specification, the user may also specify their space requirements (in Gigabytes or other units), RAID level, IO characteristics (IOPS, read/write ratio, random/sequential ratio, cache hit ratio, etc.) for volume provisioning. Similarly, for input/output (I/O) path configuration, users may specify their multipath requirements (e.g. dual fabric, no single point of failure, etc.). For disaster recovery, the user may either specify a particular type of copy services or specify a RPO/RTO of the workload.

Figure 2:
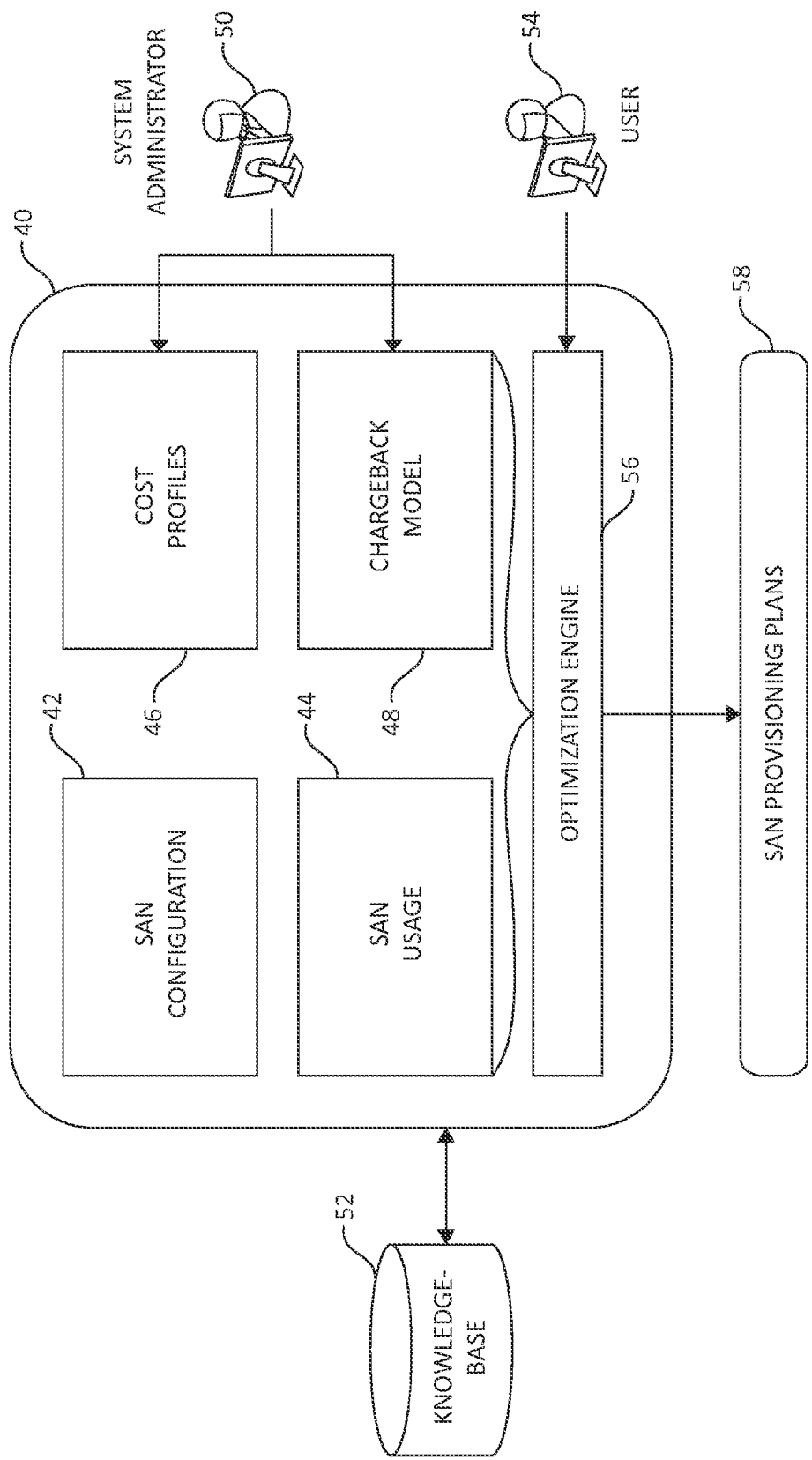
FIG. 2 is a block diagram of various portions of exemplary functionality provided by aspects of the present invention utilized to generate a listing of possible SAN provisioning plans.

Based on the foregoing, a provisioning framework may be constructed according to aspects of the present invention that includes an optimization engine for processing various types of information obtainable from the user, the system, or elsewhere. Turning to FIG. 2, a block diagram of an exemplary SAN framework 40 is depicted, which takes various information into account for processing and optimization to generate a listing of possible SAN provisioning plans. As shown, the SAN framework 40 considers such information as SAN configuration information 42, SAN usage information 44, one or more cost profiles 46, and one or more chargeback models 48.

The cost profile(s) 46 and chargeback model(s) 48 may be obtained from information provided by a system administrator 50 as shown, or elsewhere. Each of the above information, including additional information such as cost constraints previously described that are provided by a user 54, along with possibly other SAN-related information, is supplied to the optimization engine 56 for processing as shown. The optimization engine functions to generate a listing of possible SAN provisioning plans 58.

SAN configuration information 42 relates to the configuration of SAN resources. In one embodiment, this information may be obtained from storage resource management (SRM) tools such as Tivoli® Storage Productivity Center® (TPC) offered by International Business Machines Corporation ("IBM®"). The SAN configuration information includes basic information related to the composition and configuration of SAN resources. In the depicted embodiment, this information is stored and maintained in the knowledge base 52, which may include data structures as databases as one of ordinary skill in the art will appreciate.

SAN usage information 44 relates to such factors as available capacity and current usage of various SAN resources. In one embodiment, this information may also be obtained by the aforementioned SRM tools and maintained and stored in the knowledge base 52. Cost profile(s) 46 includes information such as cost data of differing SAN resources. Some of this data may include, for example, a raw storage cost per unit of storage (e.g., GB) per unit of time (e.g., year) (this may be dependent on the I/O characteristics of the workload, and also on configuration considerations of the storage system, such as applicable RAID level, type of hard disks, etc.). Additional examples of cost data may include fabric cost per year (dependent upon various fabric configurations, such as a number of redundant paths, I/O load, etc.), and copy service cost (depending on the type of workload and type of copy services implemented). In addition to the foregoing cost data, additional cost metrics may also be included in one or more cost profiles 46.

One or more chargeback models 48 represent various types of chargeback schemes implementable by IT providers. For example, IT providers may with to implement a costing scheme for bulk storage usage as opposed to light usage. Similarly, IT providers may implement costing schemes based on use time (e.g., time of day, time of month) and frequency and/or level of usage. Each of these exemplary costing schemes may be encapsulated in one or more chargeback models 48.

The optimization engine 56 is operable to filter those storage resources not meeting particular storage criteria (such as those failing various cost constraints, for example) as will be further described. The optimization engine processes the various information previously described to generate a listing of possible SAN provisioning plans 58 as shown meeting the budgetary and other requirements of the user.

In one embodiment, the total cost (TC) of a provisioning plan may be defined as follows:

$$\text{Total Cost} = \sum_i^S R(T_i, \eta_i) \cdot \eta_i,$$

where S: Set of cost entities (e.g. capacity, IO ports, copy service licenses, etc.), and
$R(T_i,\eta_i)$: Rate of resource of type $T_i$ and quantity $\eta_i$.

The goal of the optimization process is to generate provisioning plan(s) whose cost is less than the user's budget and satisfies following set of constraints:
Space Constraints:

$$\text{Workload}_i^{space} = \sum_j^{pools} \eta_{i,j} \cdot s_{i,j}$$

$$\text{Pool}_j^{space} \geq \sum_i^{workloads} \eta_{i,j} \cdot s_{i,j},$$

where $\eta_{i,j}$: Number of storage LUNs created in storage pool 'j' for workload 'i', and
$s_{i,j}$: Size of storage LUNs created in storage pool 'j' for workload 'i'.
Performance Constraints:

$$\text{Pool}_j^{util} = U_j + \sum_i^{workloads} \eta_{i,j} \cdot s_{i,j} \cdot U_{j,i}^{inc} < Util_{thresh}$$

where
$U_{j,i}^{inc}$: Utilization of storage pool 'j' if "only" 1 GB of workload 'i' is applied,
$U_j$: Existing utilization of storage pool 'j',
$\text{Pool}_j^{util}$: New utilization of storage pool 'j', and
$Util_{thresh}$: Utilization threshold, i.e. upper boundary of utilization.

The functionality performed by the optimization engine 56 may, in one embodiment, proceed as follows. As previously described, those storage resources (such as storage pools) not meeting specific storage criteria (such as cost, space, performance, other criteria) are first filtered. As a next step, each storage resource or storage pool is ranked on a cost basis. In one embodiment, as part of the process of ranking each storage resource or storage pool on a cost basis, various user-defined cost constraints may be considered, including budgetary considerations familiar to those of ordinary skill in the art. Based on such ranking, a resource configuration graph is constructed.

Figure 3:
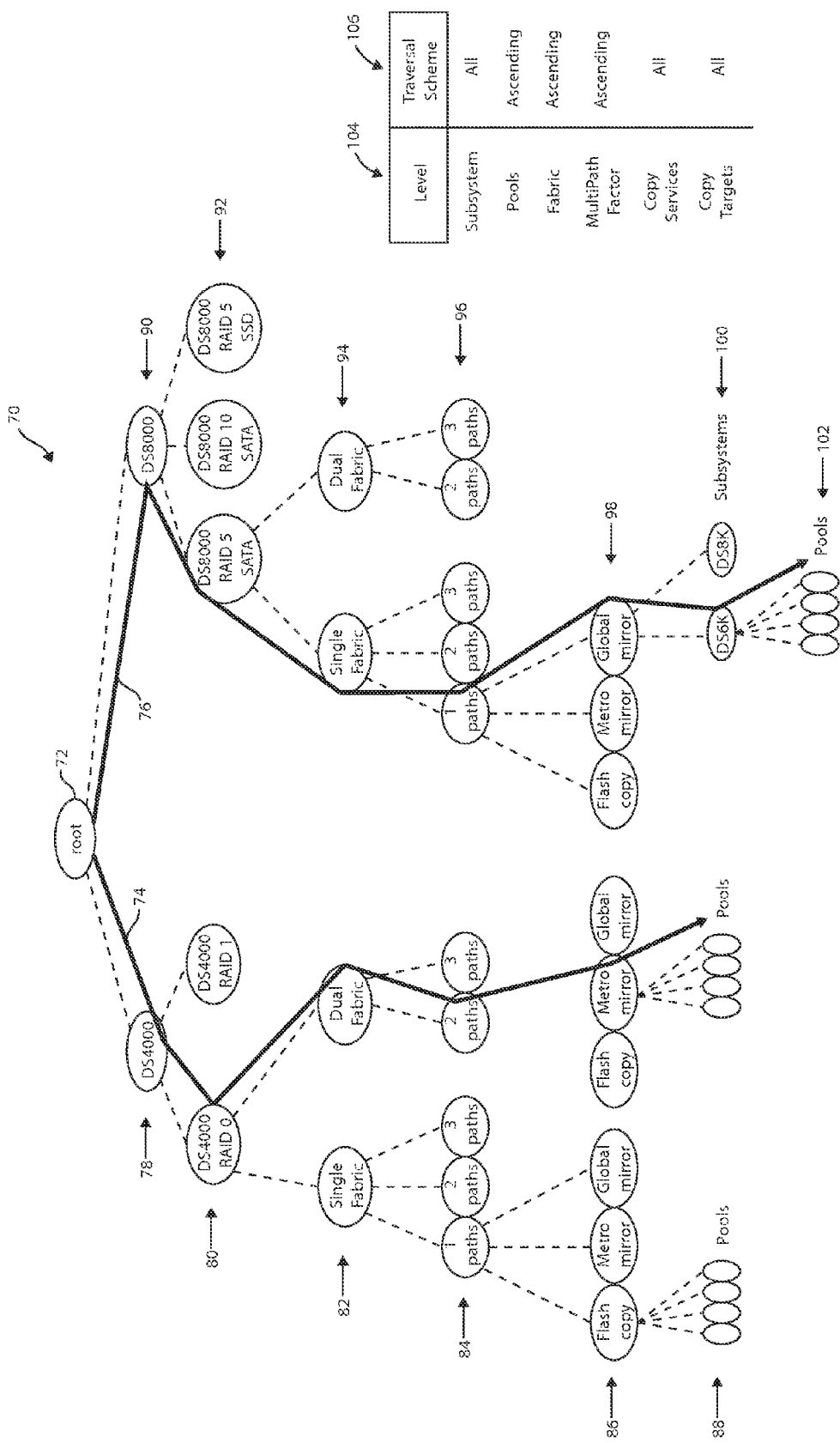
FIG. 3 is a flow diagram of a traversal of an exemplary resource configuration graph.

Turning to FIG. 3, following, such an exemplary resource configuration graph 70 is depicted. Resource configuration graph 70 is characterized by a number of hierarchical levels beginning with a root level 72, and extending through levels 78-88 in one branch, and 90-102 in another branch as shown. Each level represents one or more characteristics, relationships, or other collective aspects of the storage resources. For example, the levels 78 and 90 represent different types of storage subsystems available in a exemplary SAN environment (here represented by the IBM® DS4000® and DS8000® storage subsystems, but as one of ordinary skill will appreciate, may be represented by a wide variety of exemplary storage subsystems operable in SAN environments.) Levels 80 and corresponding level 92 represent a particular RAID configuration as shown for those storage subsystems. Levels 82 and 94 represent a particular connectivity fabric (i.e., single or dual redundant fabrics). Levels 84 and 96 represent a number of redundancy paths.

Levels 86 and 98 represent varying types of copy services relationships (here again represented by various copy services provided by IBM® such as FlashCopy®, Metro Mirror®, and Global Mirror® copy services relationships (here again, one of ordinary skill in the art will appreciate that such varying relationships correspond to specific point-in-time relationships, asynchronous or synchronous copying relationships). Level 88 represents various storage pools (inclusive of one or more storage devices, for example), while level 100 represents yet another storage subsystem and associated storage pools as shown in level 102.

Returning to the exemplary optimization process begun previously, as a next step, a graph search may be performed to identify one or more cost-efficient allocations. Pursuant to this search, a domain-aware depth-first path traversal of the resource configuration graph 70 is performed, where each tree level 104 is marked with one of the following traversal schemes 106. In the "All" traversal scheme, each node in a particular level is traversed. In the "Ascending" traversal scheme, nodes in a particular order are traversed in ascending order of their cost. If no solution is identified for the previous node, all other nodes with the same parent as the previous node are skipped. This significantly reduces the optimization time compared to an exhaustive traversal algorithm.

FIG. 3 illustrates such a sample resource configuration graph traversal. In most realistic environments inclusive of multiple subsystems and fabrics, an ordinary depth first traversal may require a significant length of time to complete. In order to facilitate a more efficient search, differing SAN resources are defined at each level and tagged with their cost information and traversal scheme (i.e., All or Ascending). The graph is traversed in the depth first manner, and the nodes in the path are tagged with cumulative cost from the root of the tree. If a path exceeds the budget, it is discarded, and the traversal returns back to the parent of the node where the path exceeded the budget. If the traversal scheme of the node is labeled "Ascending", then the traversal of rest of its sibling node is also discarded. For example, in the above graph, if the cost of "single fabric" exceeds the budget, then the cost of "dual fabric" will also exceed the budget and there is no point to evaluate that path. On the other hand, if the traversal schema is labeled "All", this indicates that all the children of a parent node need to be traversed even if one of these children may not have a solution.

Pursuant to the resource configuration graph traversal, and as a next step, a listing of possible SAN paths is identified. In the depicted embodiment, paths 74 and 76 represent possible SAN paths that satisfy each of the user and or system administrator constraints. The possible SAN paths are then ranked on the basis of cost or other administrator or user-defined attributes. In a further embodiment, the paths may be grouped on a basis of a storage subsystem type or additional defined properties. Such ranking may proceed on the basis of one or more of the following attributes: (1) total cost, (2) subsystem type, (3) fabric (e.g., single/dual), (4) multipath factor, (5) type of copy services, etc.

Once the listing of possible SAN configuration paths is obtained and ranked as described, an additional integrated provisioning framework may be constructed and applied that optimizes power by intelligent allocation of different SAN resources to different workloads. Users may specify power optimization goals, such as minimization of total power consumption while satisfaction of all other workload requirements such as space and performance, and satisfaction of a specific power consumption budget.

Based on such storage characteristics as a read/write ratio, input/output operations per second (IOPS), whether the data follows a random or sequential pattern(s), a cache hit rate, and other considerations, different workloads may consume differing amounts of power. Additionally, the level of power consumption depends on the type of storage subsystem and its configuration. A first workload may consume less power than a second workload in one storage device, for example, but consume more power in another storage device.

A further aspect of the illustrated embodiments applies as input the user optimization goals and power profiles of the SAN resources, and outputs an end-to-end provisioning plan satisfying workload requirements and various administrator or user specified goals vis-à-vis power consumption, to provide an overall cost and power-optimized SAN provisioning plan.

Figure 4:
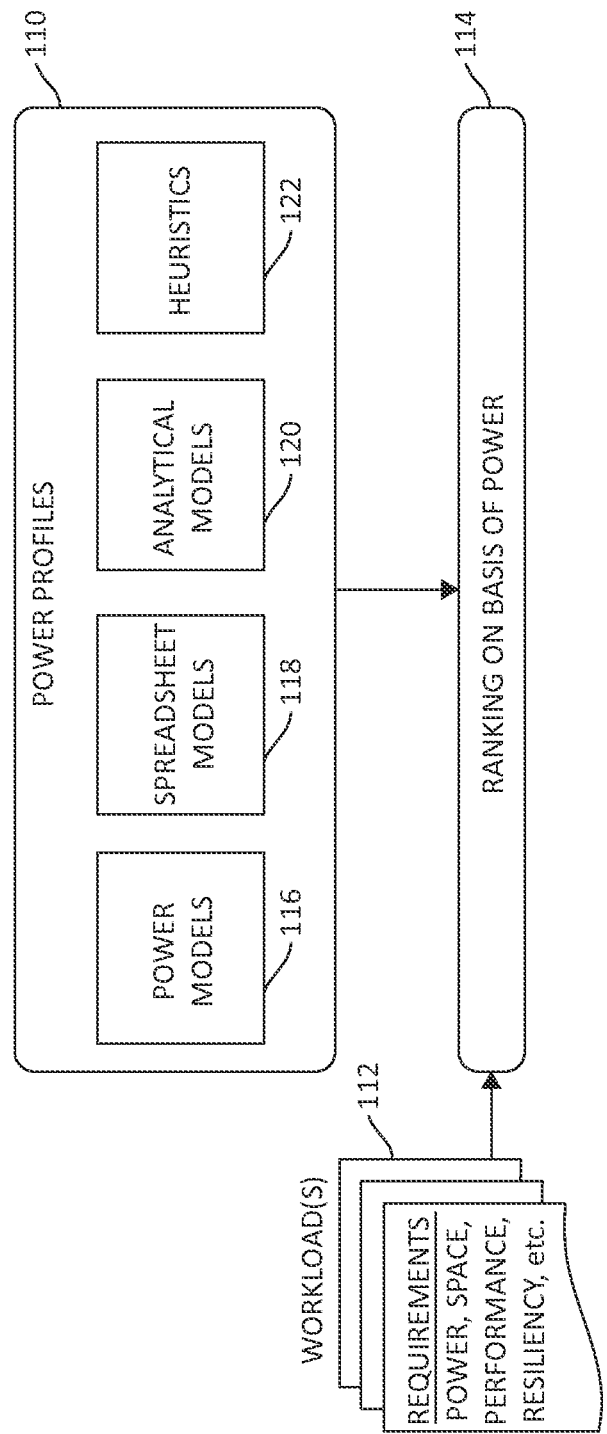
FIG. 4 is a block diagram of various portions of additional exemplary functionality provided by aspects of the present invention to generate a ranking based on a basis of power consumption.

Turning to FIG. 4, following, various exemplary functionality of this additional aspect is depicted. One or more sets of workloads having predefined characteristics and requirements (such as power consumption, space constraints, resiliency, and the like), are considered along with differing power profile information 110 to produce a ranking of the possible SAN configuration paths on a power basis 114.

As is seen in FIG. 4, the differing power profiles 110 may include various power models 116, spreadsheet models 118, analytical models 120, and heuristics 122. These various power models may be obtained directly or indirectly from device manufacturers, or from third-party device modeling tools. In one embodiment, the power profiles give average power consumption of different types of workloads on different types of storage devices.

Figure 5:
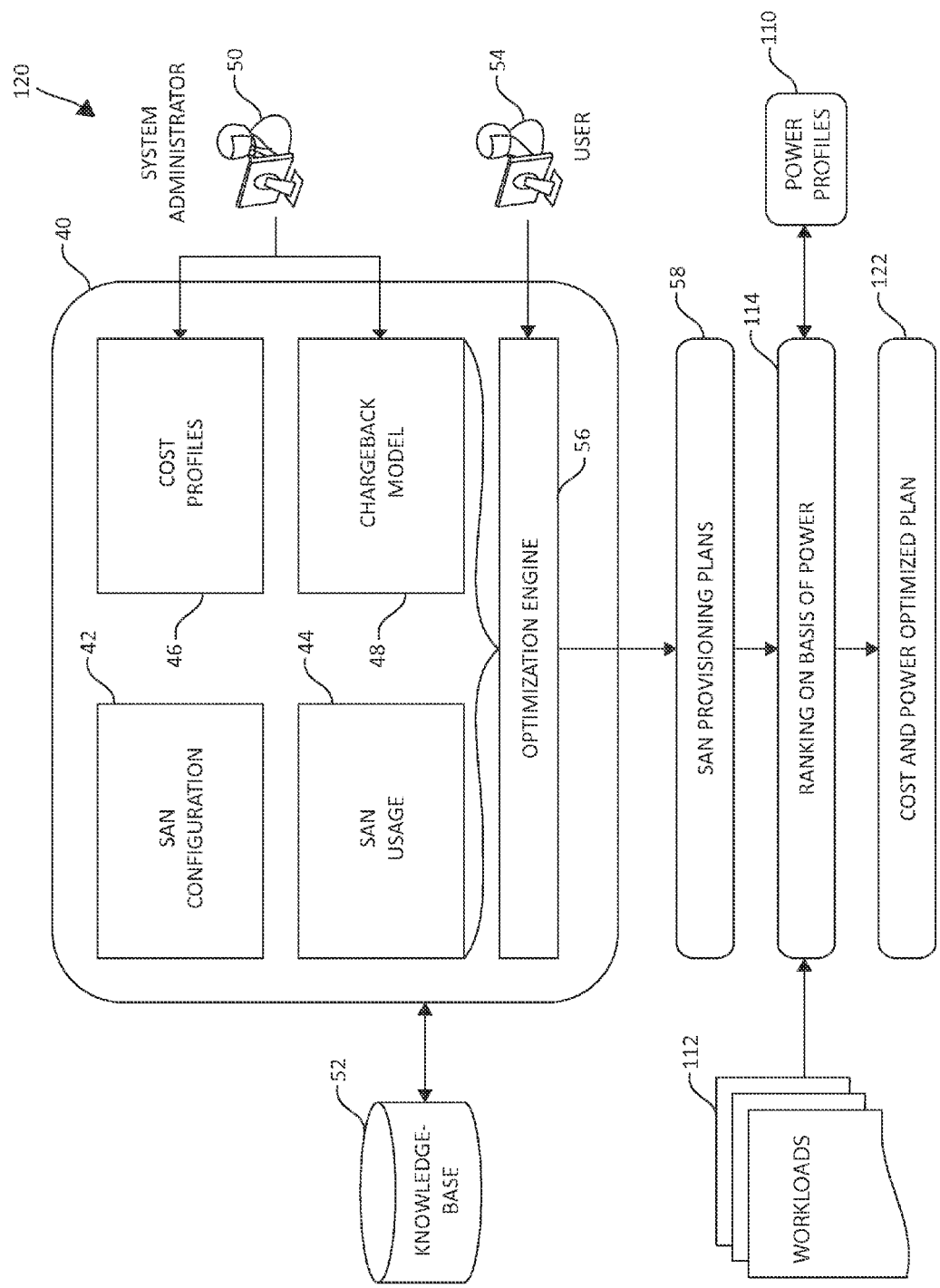
FIG. 5 is an additional block diagram of the various portions of functionality previously depicted in FIGS. 2 and 4, combined to generate a cost and power-optimized SAN provisioning plan.

Turning to FIG. 5, an exemplary optimization framework 120 is shown incorporating aspects of the illustrated embodiments for generating efficient SAN provisioning plans for both power and cost bases. As previously depicted, framework 40 incorporates various SAN information (such as SAN configuration 42, SAN usage 44, cost profiles 46, and chargeback models 48, and maintained in knowledge base 52), which is then optimized in the optimization engine 56 and provided as a listing of possible SAN provisioning plans 58.

In one embodiment, the listing of possible SAN provisioning plans 58 is ranked on the basis of power by incorporating considerations of one or more sets workload-based constraints 112 and power profile information 110 to obtain a cost and power-optimized SAN provisioning plan 122. In other embodiments, the listing of possible SAN provisioning plans 58 may be ranked and/or further ranked by user-defined attributes relating to cost, power, or other considerations such as supply chain, manufacturing, or maintenance factors. As one of ordinary skill in the art will appreciate, a variety of such attributes may be defined by a user. The ranked listing of cost and power efficient SAN provisioning plans may be provided to the user through provisioning software, for example, and presented to the user in conjunction with an interface familiar to those of ordinary skill in the art. In other embodiments, the mechanisms of the present invention may select, with or without user involvement, a SAN provisioning plan corresponding having a highest power/cost efficiency. For example, the provisioning software may be adapted to select one of the ranked listing of possible SAN configuration plans having the lowest energy consumption.

Figure 6:
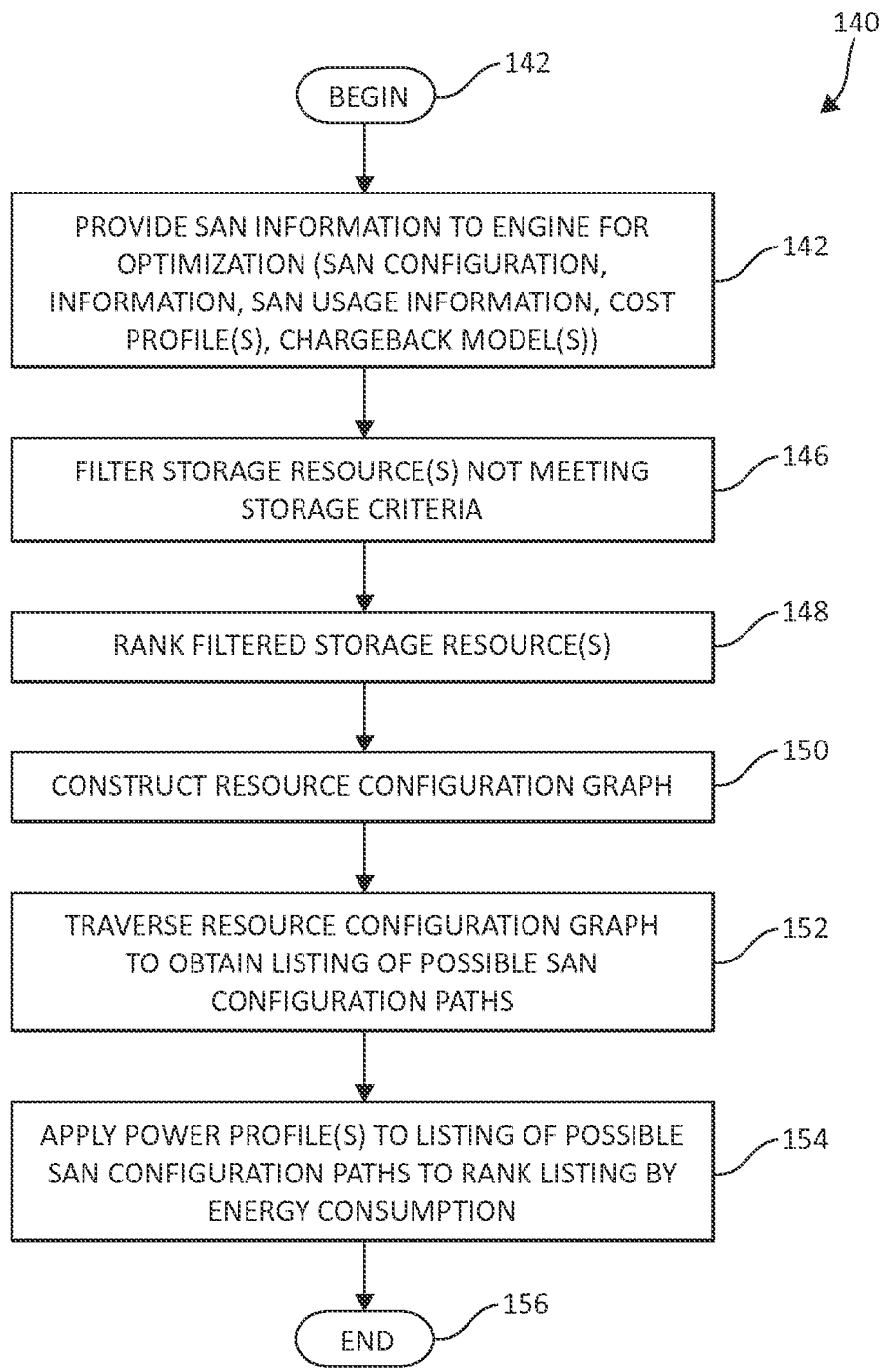
FIG. 6 is a flow chart diagram of an exemplary method for efficiently provisioning a SAN in accordance with aspects of the present invention implemented in one embodiment.

Turning now to FIG. 6, an exemplary method 140 for providing a cost and power-optimized SAN provisioning plan according to aspects of the present invention is provided. Method 140 begins (step 142) with the step of providing SAN information to the optimization engine as previously described (inclusive of the SAN configuration information, SAN usage information, cost profile information and chargeback models) (step 144). Those storage resources not meeting one or more storage criteria (here again, such as performance, space, cost, and other constraints) are filtered (step 146). The remaining filtered storage resources are ranked (step 148) to construct a resource configuration graph (step 150). The resource configuration graph is traversed (e.g., such as in the exemplary form previously described) to obtain a listing of possible SAN configuration paths (step 152). One or more power profile and workload considerations are applied to the ranked listing to further rank the listing in terms of energy consumption (step 154). The method 140 then ends (step 156).

Figure 7:
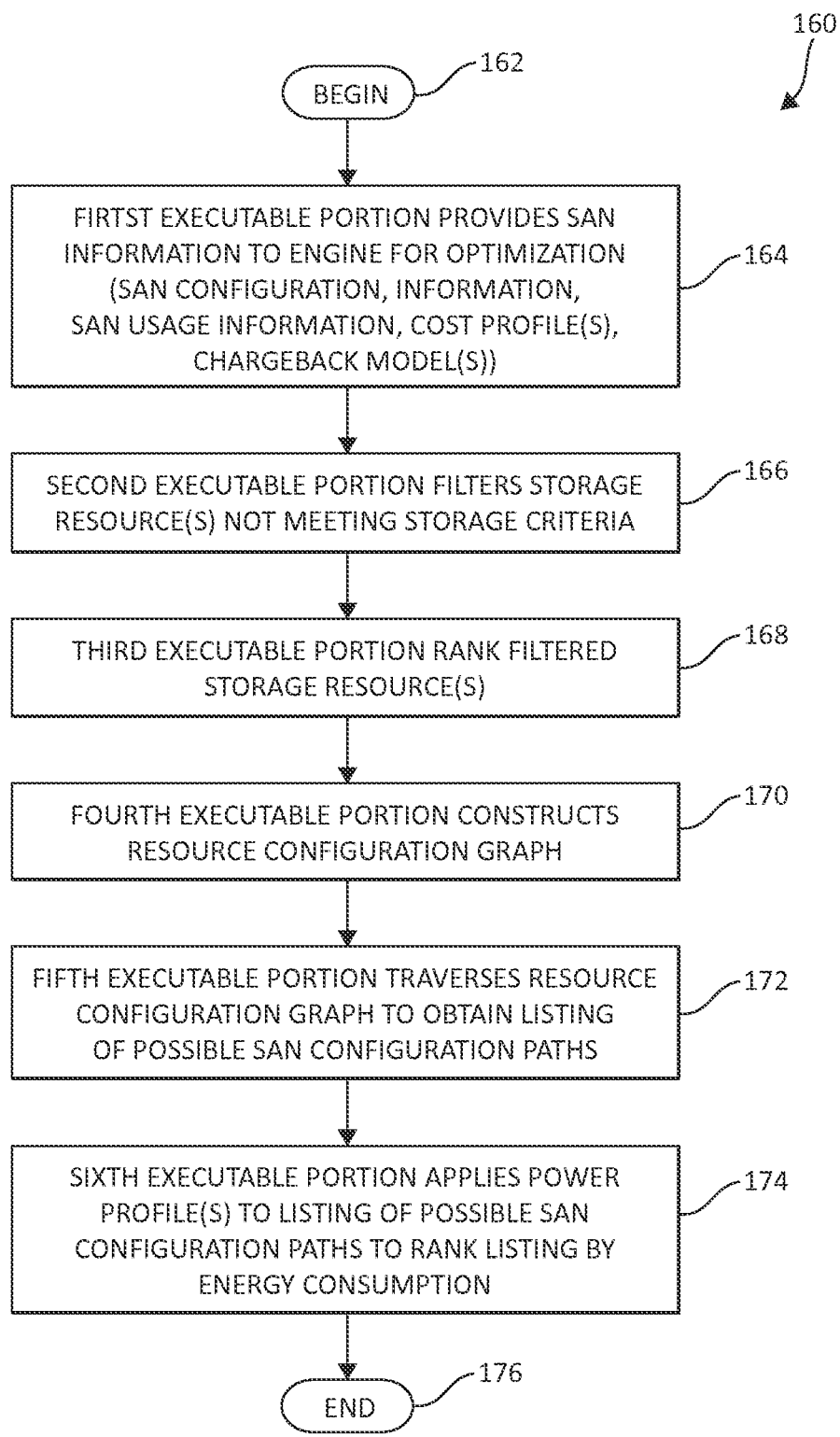
FIG. 7 is a flow chart diagram of the method previously depicted in FIG. 6 embodied in a computer program product.

Turning now to FIG. 7, an exemplary method 160 for providing a cost and power-optimized SAN provisioning plan as embodied in a computer program product is provided. Method 160 begins (step 162) with the step of a first executable portion providing SAN information to the optimization engine as previously described (inclusive of the SAN configuration information, SAN usage information, cost profile information and chargeback models) (step 164). Those storage resources not meeting one or more storage criteria (here again, such as performance, space, cost, and other constraints) are filtered (step 166) pursuant to operation of a second executable portion. The remaining filtered storage resources are ranked pursuant to operation of a third executable portion (step 168) to construct a resource configuration graph (step 170) by operation of a fourth executable portion. The resource configuration graph is traversed (e.g., such as in the exemplary form previously described) to obtain a listing of possible SAN configuration paths (step 172) by operation of a fifth executable portion. One or more power profile and workload considerations are applied to the ranked listing to further rank the listing in terms of energy consumption (step 174) by operation of a sixth executable portion. The method 160 then ends (step 176).

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "process" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, or entirely on the remote computer or server. In the last scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for efficiently provisioning a storage area network (SAN) by a processor device, comprising:
providing SAN information to an engine for optimization, wherein the SAN information includes each of SAN configuration information, SAN usage information, at least one cost profile, and at least one chargeback model;
based on the SAN information, filtering those of an available plurality of storage resources not meeting at least one storage criterion, wherein the storage criterion includes at least one of cost, performance, and space of the SAN;
ranking the filtered storage resources on a cost basis;
constructing a resource configuration graph based on the ranked storage resources, wherein the resource configuration graph includes a plurality of hierarchical levels with each of the plurality of hierarchical levels representing at least characteristics and relationships of the ranked storage resources;
traversing the resource configuration graph to obtain a plurality of possible SAN configuration plans, wherein the traversing is based upon the filtering, ranking, and constructing; and
applying at least one power profile to the plurality of possible SAN configuration plans to rank the plurality of possible SAN configuration plans by energy consumption,
wherein one power profile to the plurality of possible SAN configuration plans includes applying a workload-based power model, a spreadsheet-based power model, an analytical model, and a heuristic model.

2. The method of claim 1, further including grouping the ranked plurality of possible SAN configuration plans by a user-defined attribute.

3. The method of claim 1, further including providing the ranked plurality of possible SAN configuration plans to a user.

4. The method of claim 1, further including selecting one of the ranked plurality of possible SAN configuration plans having a lowest energy consumption.

5. The method of claim 1, wherein applying at least one of a workload-based power model includes considering at least one of a power constraint, space constraint, performance constraint, and resiliency constraint.

6. The method of claim 1, wherein ranking the filtered storage resources on the cost basis includes ranking the filtered storage resources on at least one of a total cost, subsystem type, fabric, multipath factor, and copy services basis.

7. The method of claim 1, wherein ranking the filtered storage resources on the cost
basis includes considering a user-defined cost constraint.

8. A system for efficiently provisioning a storage area network (SAN), comprising:
a processor; a memory; and
a storage management module operational in the SAN in communication with the processor, wherein the storage management module is adapted for:
providing SAN information to an engine for optimization, wherein the SAN information includes each of SAN configuration information, SAN usage information, at least one cost profile, and at least one chargeback model,
based on the SAN information, filtering those of an available plurality of storage resources not meeting at least one storage criterion, wherein the storage criterion includes at least one of cost, performance, and space of the SAN,
ranking the filtered storage resources on a cost basis, constructing a resource configuration graph based on the ranked storage resources, wherein the resource configuration graph includes a plurality of hierarchical levels with each of the plurality of hierarchical levels representing at least characteristics and relationships of the ranked storage resources,
traversing the resource configuration graph to obtain a plurality of possible SAN configuration plans, wherein the traversing is based upon the filtering, ranking, and constructing, and
applying at least one power profile to the plurality of possible SAN configuration plans to rank the plurality of possible SAN configuration plans by energy consumption,
wherein one power profile to the plurality of possible SAN configuration plans includes applying a workload-based power model, a spreadsheet-based power model, an analytical model, and a heuristic model.

9. The system of claim 8, wherein the storage management module is further adapted for grouping the ranked plurality of possible SAN configuration plans by a user-defined attribute.

10. The system of claim 8, wherein the storage management module is further adapted for providing the ranked plurality of possible SAN configuration plans to a user.

11. The system of claim 8, wherein the storage management module is further adapted for selecting one of the ranked plurality of possible SAN configuration plans having a lowest energy consumption.

12. The system of claim 8, wherein the storage management module is further adapted for considering at least one of a power constraint, space constraint, performance constraint, and resiliency constraint.

13. The system of claim 8, wherein the storage management module is further adapted for ranking the filtered storage resources on at least one of a total cost, subsystem type, fabric, multipath factor, and copy services basis.

14. The system of claim 8, wherein the storage management module is further adapted for considering a user-defined cost constraint.

15. The system of claim 8, wherein the storage management module is operational as a storage management processor (SMP) in the SAN.

16. A computer program product for efficiently provisioning a storage area network (SAN) using a processor device, the computer program product comprising a non-transitory computer-readable storage medium having computer-readable program code portions stored therein, the computer-readable program code portions comprising:
a first executable portion for providing SAN information to an engine for optimization, wherein the SAN information includes each of SAN configuration information, SAN usage information, at least one cost profile, and at least one chargeback model;
a second executable portion for, based on the SAN information, filtering those of an available plurality of storage resources not meeting at least one storage criterion, wherein the storage criterion includes at least one of cost, performance, and space of the SAN;
a third executable portion for ranking the filtered storage resources on a cost basis;
a fourth executable portion for constructing a resource configuration graph based on the ranked storage resources, wherein the resource configuration graph includes a plurality of hierarchical levels with each of the plurality of hierarchical levels representing at least characteristics and relationships of the ranked storage resources;
a fifth executable portion for traversing the resource configuration graph to obtain a plurality of possible SAN configuration plans, wherein the traversing is based upon the filtering, ranking, and constructing; and
a sixth executable portion for applying at least one power profile to the plurality of possible SAN configuration plans to rank the plurality of possible SAN configuration plans by energy consumption,
wherein one power profile to the plurality of possible SAN configuration plans includes applying a workload-based power model, a spreadsheet-based power model, an analytical model, and a heuristic model.

17. The computer program product of claim 16, further including a seventh executable portion for grouping the ranked plurality of possible SAN configuration plans by a user-defined attribute.

18. The computer program product of claim 16, further including a seventh executable portion for providing the ranked plurality of possible SAN configuration plans to a user.

19. The computer program product of claim 16, further including a seventh executable portion for selecting one of the ranked plurality of possible SAN configuration plans having a lowest energy consumption.

20. The computer program product of claim 16, further including an eighth executable portion for considering at least one of a power constraint, space constraint, performance constraint, and resiliency constraint.

21. The computer program product of claim 16, further including a seventh executable portion for ranking the filtered storage resources on at least one of a total cost, subsystem type, fabric, multipath factor, and copy services basis.

22. The computer program product of claim 16, further including a seventh executable portion for considering a user-defined cost constraint.

* * * * *